O. BOLSTER.
Animal Stall.
No. 33,473.
Patented Oct. 15, 1861.
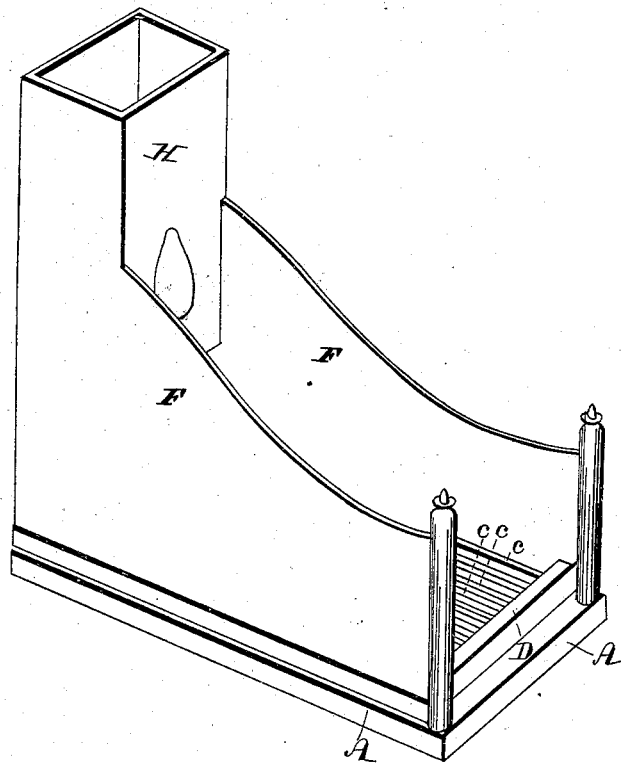
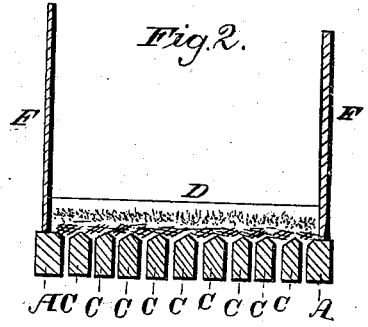

UNITED STATES PATENT OFFICE.

OLNEY BOLSTER, OF WORCESTER, MASSACHUSETTS.

IMPROVED STALL FOR ANIMALS.

Specification forming part of Letters Patent No. 33,473, dated October 15, 1861.

*To all whom it may concern:*

Be it known that I, OLNEY BOLSTER, of the city and county of Worcester, State of Massachusetts, have invented certain new and useful Improvements in Stalls for Animals; and I do hereby declare the following to be a full, clear, and exact description of the same, reference being had to the accompanying drawings, in which—

Figure 1 is a perspective view of a stall constructed with my improvements. Fig. 2 is a cross-section showing the floor and adjacent parts, as hereinafter described.

The same letters refer to the same parts in both figures.

My invention relates more particularly to the construction and arrangement of the floor and its adjacent parts; and it consists in making the floor of timber $c\ c\ c\ c\ c\ c\ c$, laid the length of the stall a short distance apart and making the top surface of each with a sloping or beveled surface, as shown in Fig. 2, to prevent water standing thereon, and at the back end of the stall place a stop-piece D to extend a short distance above the floor to keep the bedding B in place.

A A are the sills or outside frame; F F, the sides, and H the manger.

Upon the timbers $c\ c\ c\ c$ is put first a coarse stratum (either straw, fine brush, or gravel, or other substance) that is sufficiently so as not to fall between them, and on that a finer bedding, for which spent tan, sawdust, &c., may be used, filling up nearly to the height of the stop, which prevents its being misplaced. This construction and arrangement make a free escape for the liquors, and the stop D serves both to prevent the bedding being pawed back out of the stall and also keeps the animal in, thus avoiding the necessity of the chain frequently used, it being found that when the animal steps back off the stop it immediately returns to place on finding the difference of the height of the parts.

I am aware that stalls have been made with perforated floors and slatted or double floors. These I do not claim, as mine is essentially different; but

What I claim as new, and desire to secure by Letters Patent, is—

The combination and arrangement of the beveled floor-timbers and the stop D, when constructed in the manner and for the purposes substantially as above set forth and described.

OLNEY BOLSTER.

Witnesses:
C. M. MILES,
JAMES G. ARNOLD.